(12) United States Patent
Awamura

(10) Patent No.: US 7,002,739 B2
(45) Date of Patent: Feb. 21, 2006

(54) DEVICE FOR GENERATING LINE-SHAPED LIGHT BEAM AND LASER MICROSCOPE

(75) Inventor: Daikichi Awamura, Yokohama (JP)

(73) Assignee: Ohkura Industry Co., Yokohama (JP)

( * ) Notice: Subject to any disclaimer, the term of this patent is extended or adjusted under 35 U.S.C. 154(b) by 126 days.

(21) Appl. No.: 10/683,272

(22) Filed: Oct. 14, 2003

(65) Prior Publication Data
US 2005/0036197 A1    Feb. 17, 2005

(30) Foreign Application Priority Data
Aug. 11, 2003    (JP) ............................... 2003-291650

(51) Int. Cl.
*G02B 21/06* (2006.01)
(52) U.S. Cl. ...................... 359/385; 359/368; 359/291; 359/224
(58) Field of Classification Search ................ 359/385, 359/368, 290–291, 298, 224, 364
See application file for complete search history.

(56) References Cited

U.S. PATENT DOCUMENTS

| | | | | |
|---|---|---|---|---|
| 3,947,093 | A * | 3/1976 | Goshima et al. ............. | 359/716 |
| 6,147,789 | A * | 11/2000 | Gelbart ........................ | 359/231 |
| 6,513,939 | B1 * | 2/2003 | Fettig et al. ................. | 359/847 |
| 6,660,964 | B1 * | 12/2003 | Benderly ............... | 219/121.74 |
| 6,661,561 | B1 * | 12/2003 | Fitzpatrick et al. ......... | 359/291 |
| 2004/0113059 | A1 * | 6/2004 | Kawano et al. ............. | 250/234 |

OTHER PUBLICATIONS

U.S. Appl. No. 60/433,825.*

* cited by examiner

*Primary Examiner*—Mark A. Robinson
*Assistant Examiner*—Lee Fineman
(74) *Attorney, Agent, or Firm*—Oliff & Berridge, PLC

(57) ABSTRACT

A laser microscope is provided, which is low in manufacturing costs and compact in structure. A laser beam emitted from a semiconductor laser is converted into a rectilinear light beam which has divergence in one direction by use of a micromirror device. The micromirror device comprises a plurality of micromirrors arranged in a two-dimensional array, and each micromirror is vibrated at a high speed by a driving pulse. Since each micromirror is movably supported by a hinge, a mirror layer of the micromirror is displaced in a curved manner by the electrostatic attractive force caused by the driving pulse. By this curved displacement of the mirror layer, each micromirror operates as a cylindrical mirror to convert an incident laser beam into an incoherent light beam which diverges in one direction. The rectilinear beam is projected to a sample through a beam deflection device and an objective lens, and a reflected light from the sample is made incident on a linear image sensor. Since the micromirror device is relatively low in costs and a relatively large diverging angle is obtained, the laser microscope low in manufacturing costs and compact in structure can be achieved.

12 Claims, 2 Drawing Sheets

DEVICE FOR GENERATING LINE-SHAPED LIGHT BEAM AND LASER MICROSCOPE

BACKGROUND OF THE INVENTION

1. Field of the Invention

The present invention relates to a laser microscope which uses a micromirror device.

The present invention also relates to a device for generating line-shaped light beam having a thin elongated cross section, which converts a laser beam emitted from a laser light source into an incoherent line-shaped light beam by use of the micromirror device.

2. Description of the Related Art

There has been known a laser microscope in which a surface of a sample to be observed is scanned two-dimensionally by a laser beam and reflected light from the sample is received by a linear image sensor. In such laser microscope, a laser beam generated from a laser light source is deflected in a main scanning direction at a high speed by an acoustic-optical element and deflected in a sub-scanning direction perpendicular to the main scanning direction using a galvano-mirror, whereby the surface of the sample is two-dimensionally scanned by use of laser beam. The laser microscope can achieve high resolution as it uses a confocal optical system, and it has been used for various purposes in which high-resolution images are required. The laser microscope which uses the confocal optical system also has an advantage that, since the surface of the sample is two-dimensionally scanned, quality of an image to be picked up is not deteriorated even if there is a speckle pattern in the laser beam.

Although the laser microscope using the laser beam has an advantageous effect capable of picking up a high-resolution image, a disadvantage of high manufacturing cost of the microscope has been pointed out, because the cost of the acoustic-optical element which deflects the laser beam in the main scanning direction is extremely high. There has been another disadvantage that because of a relatively small beam deflection angle of the acousto-optic element, an optical path length of the optical system must be made longer in order to obtain a desired scanning length on the sample, and consequently the microscope device has been enlarged.

Further, as the acoustic-optical element has wavelength dependence, acoustic-optical elements having different setting conditions must be prepared for each wavelength of laser beams to be used. For example, in the case of a color microscope, acoustic-optical elements having different set conditions must be prepared for each color light, which has caused high manufacturing costs.

To solve such disadvantages, there has been known a method in which a light beam generated from the laser light source is converted into a rectilinear beam having thin elongated cross section in one direction by using a cylindrical lens and in which the surface of the specimen is scanned by the rectilinear beam. However, in the case of using the rectilinear beam produced by cylindrical lens, because of high coherence of the laser beam, many speckle patterns are generated in the rectilinear beam, and thus a high-quality image cannot be picked up. In this case, a method is available which uses a light source such as a mercury lamp to produce incoherent light beams. However, because the mercury lamp is large in size and high in price, there is a disadvantage that the size of the microscope is enlarged and manufacturing costs become high. Thus, if a light source which generates incoherent line-shaped light beams is developed, it is possible to greatly reduce manufacturing costs of the laser microscope and to miniaturize the structure thereof.

SUMMARY OF THE INVENTION

The present invention has for its object to provide a laser microscope which uses no acoustic-optical elements, and which is low in manufacturing costs and small and compact in structure.

Another object of the present invention is to provide a laser microscope in which no glaring or speckle patterns are formed even if a laser source is used as a light source for emitting a light beam, and which can pick up high-quality images.

Yet another object of the present invention is to provide an optical device for emitting a rectilinear light beam which can produce an incoherent rectilinear light beam having thin elongated cross section and which can be applied to various optical scanning devices.

Further object of the present invention is to provide a device for emitting a rectilinear light beam which has no wavelength dependence.

In accordance with a first aspect of the present invention, there is provided An optical device for emitting a rectilinear light beam having thin elongated cross section comprising a laser light source for emitting a laser beam with substantially circular or elliptical cross section; a micromirror device for receiving the laser beam emitted from the laser source and having a plurality of micromirrors, each mirror layer of which is able to be curved in one direction in accordance with a driving pulse signal; and a micromirror device driving circuit for supplying the driving pulse signal with a predetermined frequency to the micromirrors; wherein each micromirror operates as a cylindrical mirror curved substantially in one direction as a whole by the pulse signal supplied from the micromirror device driving circuit, and the laser beam emitted by the laser light source is converted by the micromirror device to a rectilinear light beam having a thin elongated cross section and diverging in a first direction.

In accordance with a second aspect of the present invention, there is provided a laser microscope comprising a laser light source for emitting a laser beam having a circular or elliptical cross section; a micromirror device having a plurality of micromirrors whose mirror layer is able to be curved in one direction as a whole according to a driving pulse signal, receiving the laser beam emitted by the laser source and converting the incident laser beam into a rectilinear light beam which extends and diverges in a first direction; a micromirror driving circuit which supplies the driving pulse signal with a predetermined frequency to each micromirror; a beam deflection device for deflecting the rectilinear light beam emitted from the micromirror device in a second direction perpendicular to the first direction; an objective lens for focusing the rectilinear light beam emitted from the beam deflection device and projecting the focused rectilinear light beam onto a sample to be observed; a linear image sensor having a plurality of light receiving elements arranged in a direction corresponding to the first direction in which the rectilinear light beam extends on the sample, and receiving a reflected light from the sample; and a signal processing circuit which sequentially reads out charges stored in each of the light receiving elements of the linear image sensor at a predetermined reading frequency and outputs a video signal.

The micromirror device (digital mirror device: DMD) is commonly used as a display in which each micromirror constitutes a pixel of an image. That is, when a driving pulse signal is supplied to each micromirror, each micromirror element carries out a switching operation to rotate in accordance with the driving signal, and images are displayed in accordance with a video signal. Meanwhile, when a laser beam is projected onto the micromirror device and an image of its reflected light is projected, the reflected beams from the micromirror elements interfere each other and a pattern of bright points formed in an array is projected. Further, when micromirrors are switched by use of driving pulse, the bright points are moved only. Therefore, it is impossible to emit a scanning beam from the micromirror device when the micromirror device is used as a beam deflection device.

The inventors conducted various experiments and analyses for a relation between its reflected beam and a driving frequency by projecting the laser beam to the micromirror device at various driving frequency. It was confirmed that as the frequency became higher, the bright point patterns in the array disappeared, and a rectilinear diverging light beam was generated. That is, the micromirror device was driven in the frequency band used for an image display device, the pattern of the bright points in an array were merely formed. However, when the driving frequency was gradually increased, luminance of each bright point of the pattern was gradually reduced, and a rectilinear luminous flux was generated in one direction. When the driving frequency was set to a higher speed, almost all the bright point sprinkled in the array disappeared, and a rectilinear light beam having uniform luminance and diverging in one direction without speckle patterns was generated. According to the present invention, by using the characteristics of the micromirror device obtained by the experiments, the micromirror device is used as a device for generating a rectilinear light beam.

Specific operations of the above micromirror device can be understood as follows. That is, the mirror layer of each micromirror of the micromirror device or the digital mirror device (DMD) is connected to a yoke (pedestal portion) by a hinge serving as a supporting point. Spring chips are disposed in the yoke and the hinge to store electrostatic attractive force between them and a metal layer of a lower side. When a driving signal is applied to the micromirror device, the electrostatic attractive force is caused between the yoke and the hinge and the metal layer of the lower side. When the micromirror device is driven at the frequency band used as the image display unit, the mirror surface is rotated with its planarity being maintained. While, when the driving frequency is gradually increased, the mirror plane cannot maintain its planarity because of a high-speed switching operation, and the mirror layer may be deformed or curved in one direction. Further, it can be conceived that the curving amount of the mirror laser and the displacement amount of each portion of the mirror layer may change with time. That is, since the mirror layer is supported by the hinge which serves as a supporting point, as a switching speed becomes higher, each portion of the mirror layer is displaced differently with each other. This high-speed displacement gradually reduces the planarity of the mirror surface, and all of the mirror surfaces of the mirror layer may be changed to a curved surface in which both sides are curved around the hinge. Thus, when the mirror surface is curved around the hinge, all of the micromirrors function as a cylindrical mirror to reflect and diverge an incident light in one direction. Since all the mirror surfaces are curved in the same direction as a whole, micro beam portions of the incident laser beam striking on the different points of the mirror surface are converted into micro beam portions which diverges in one direction in the different diverging angle.

Therefore, since the micromirror device functions as an aggregate of microcylindrical mirrors curved in the same direction as a whole, a beam which diverges in one direction is emitted from the micromirror device. As a result, at a position apart from the micromirror device by a certain optical path length, the beam emitted from the micromirror device becomes an incoherent and rectilinear light beam which diverges in one direction.

FIGS. 1A and 1B are diagrams schematically showing an operation of each micromirror imagined when the micromirror device is driven by a driving pulse which causes electrostatic attractive force on the yoke. FIG. 1A shows a state in which no electrostatic attractive force is caused, and FIG. 1B shows a state in which a driving pulse is applied to cause the electrostatic attractive force. As shown in FIG. 1A, in the state where no electrostatic attractive force is caused, each mirror surface is maintained in a state where its planarity is kept. On the other hand, when the electrostatic attractive force is caused by supplying the driving pulse switching at a high frequency rate, both ends of the mirror surface are attracted to the lower side, and both ends are greatly displaced around the hinge so that the mirror surface becomes a curved state. When the driving frequency is set even higher, the micromirror device is switched between the states FIG. 1A and FIG. 1B at a high speed. That is, the micromirror device operates as an aggregate of a plurality of cylindrical mirrors as a whole.

Since each mirror surface of the micromirror of the micromirror device is displaced in accordance with the driving pulse and each displacement of the respective portions on the mirror surface is different from each other, the phase relation between the reflected beam portions is maintained no longer and thus the rectilinear light beam emitted from the micromirror device becomes an incoherent light beam. As the displacement amount of the mirror surface of each micromirror element changes with time, each micromirror constitutes a cylindrical mirror in which a curvature radius is changed at a high speed with time. Thus, the laser beam made incident on the micromirror device is converted into a light beam vibrated in one direction at a high speed in accordance with a frequency of the driving signal.

According to the present invention, the incoherent rectilinear light beam emitted from the micromirror device is deflected in the second direction perpendicular to the extending direction of the rectilinear light beam by using a beam deflection device such as a vibration mirror or a galvano-mirror. Then, the deflected beam is focused by the objective lens onto the sample to scan the surface of the sample. As a result, the surface of the sample is scanned by the rectilinear light beam without glare. As a diverging angle of the light beam emitted from the micromirror device is much larger than a deflection angle of the acoustic-optical device, it is possible to greatly shorten an optical path length from the micromirror device to the objective lens. Moreover, since the micromirror device is much lower in price than the acoustic-optical element, a compact and inexpensive laser microscope can be achieved.

According to the preferred embodiment of the laser microscope according to the present invention, the reflected light from the sample is condensed by the objective lens and is made incident on a linear image sensor through the beam deflection device. In this way, by making the reflected beam from the sample incident through the beam deflection device onto the linear image sensor, even if the scanning beam is displaced on the sample with time, it strikes liner image sensor as a static beam. As a result, it is possible to take out a sample image as a video signal by reading out the charges stored in each light receiving element of the linear image sensor, e.g., at a television frequency.

According to the preferred embodiment of the laser microscope of the present invention, an expander optical system for converting the laser beam emitted from the laser source into an expanded parallel beam and a cylindrical lens for focusing the expanded laser beam emitted from the expander optical system in a second direction perpendicular to the first direction are arranged in the optical path between the laser source and the micromirror device so that the laser beam focused in the second direction is made incident on the micromirror device. As a result, it is possible to further increase conversion efficiency in the micromirror device.

According to the preferred embodiment of the laser microscope, a second cylindrical lens which has focusing ability only in the second direction is arranged on an optical path of an emission side of the micromirror device so that the rectilinear light beam focused in the second direction is formed on an illumination path. The light beam emitted from the micromirror device is a diverging light beam which manly diverges in the first direction, however, such diverging light beam may slightly diverges also in a second direction perpendicular to the first direction. In such a case, by arraigning a cylindrical lens which has a focusing ability only in the second direction on the optical path of the emission side of the micromirror device, the rectilinear illumination beam focused in the second direction can be formed on the illumination side. As a result, it is possible to achieve high line confocality in combination with the linear image sensor and to pick up a sample image of high resolution.

According to the preferred embodiment of the laser microscope of the invention, a focusing lens is arranged in the optical path between the micromirror device and the beam deflection device to convert the diverging rectilinear beam emitted from the micromirror device into the rectilinear light beam which extends substantially parallel to the first direction. By arranging such focusing lens, it is possible to use a whole amount of the light beam emitted by the light source as an illumination light beam.

According to another preferred embodiment of the laser microscope of the present invention, a spatial filter having a slit extending in the first direction is arranged on the optical path between the focusing lens and the beam deflection device so that the rectilinear light beam is formed on the illumination path side. By using the focusing lens and the slit in combination, a thin rectilinear illumination beam is formed on the illumination path. Thus, it is advantageous in obtaining confocal performance.

According to the invention, there is provided an optical device for emitting a rectilinear light beam having thin elongated cross section comprising a laser light source for emitting a laser beam with substantially circular or elliptical cross section; a micromirror device for receiving the laser beam emitted from the laser source and having a plurality of micromirrors, each mirror layer of which is able to be curved in one direction in accordance with a driving pulse signal; and a micromirror device driving circuit for supplying the driving pulse signal with a predetermined frequency to the micromirrors, wherein each micromirror operates as a cylindrical mirror curved substantially in one direction as a whole by the pulse signal supplied from the micromirror device driving circuit, and the laser beam emitted by the laser light source is converted by the micromirror device to a rectilinear light beam having a thin elongated cross section and diverging in a first direction. As described above, since the mirror layer of the micromirror operates as the cylindrical mirror which displaces at a high speed, coherence of the incident laser beam is lost and the incoherent rectilinear light beam having a thin elongated cross section is emitted. Thus, since the rectilinear light beam without speckle patterns is obtained, it is possible to generate a rectilinear light beam useful for various optical scanning devices. Especially, since the acoustic-optical device has wavelength dependence, it is necessary to prepare acoustic-optical devices suited to each color light of R, G and B. On the contrary, since the micromirror device has no wavelength dependence, there is obtained an advantage that the same device can be used for each wavelength light beams of R, G, B, when the micromirror device is used as a scanning beam generating means.

As the driving signal supplied from the micromirror driving circuit to each micromirror, a rectangular pulse in which amplitude is constant with respect to time can be used. Alternatively, a sawtooth-wave driving signal in which amplitude is continuously changed with time or a diving signal in which amplitude is changed in a sine-wave shape can be used.

BRIEF DESCRIPTION OF THE DRAWINGS

These and other objects and features of the invention will become clearer from the following description of the preferred embodiments given with reference to the attached drawings, wherein.

DESCRIPTION OF THE PREFERRED EMBODIMENTS

Figure 1A:
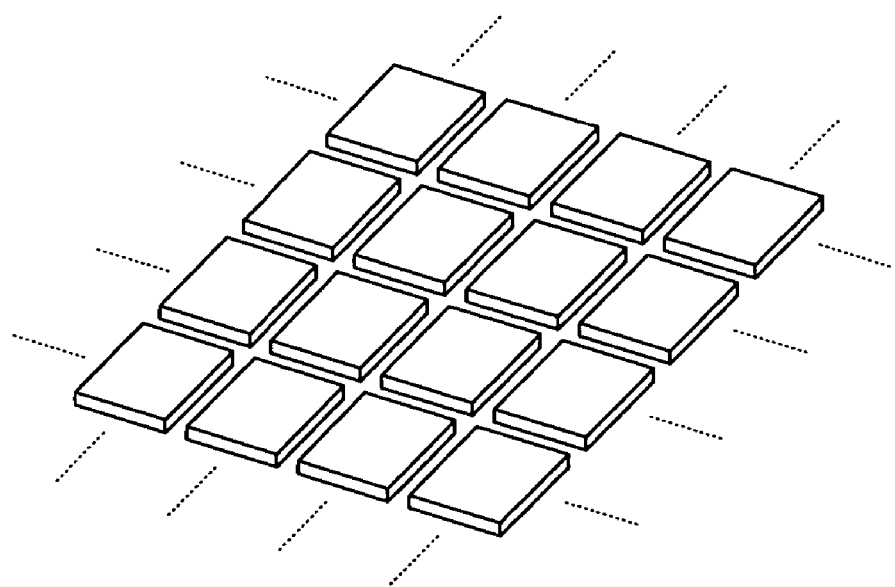
FIGS. 1A and 1B are perspective views showing an expected operation of a micromirror device.
Figure 1B:
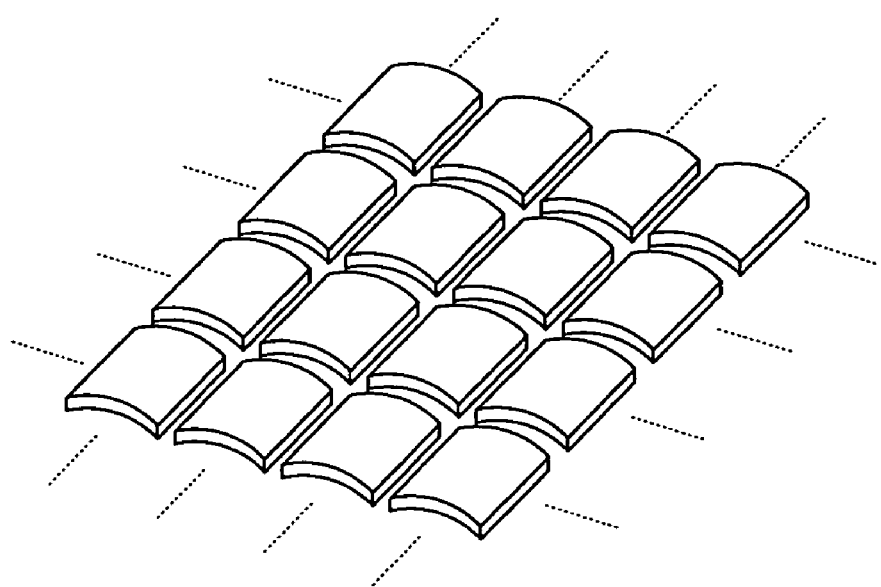
Figure 2:
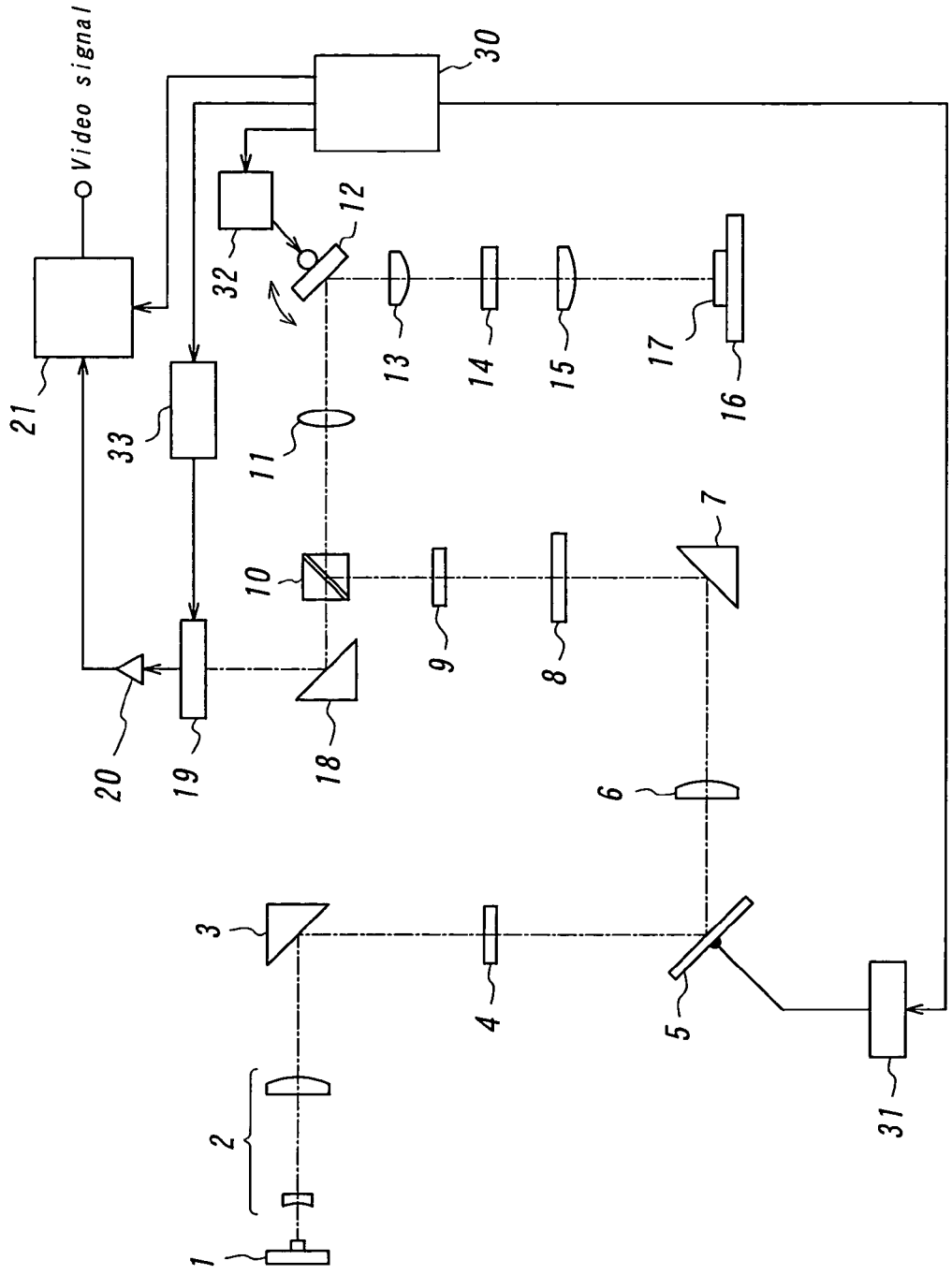
FIG. 2 is a diagram showing an example of a laser microscope of the present invention using the micromirror device.

FIG. 2 is a diagram showing an example of a laser microscope of the present invention. According to the invention, a semiconductor laser is used as a light source for generating a light beam. A laser beam emitted from a semiconductor laser 1 is converted into expanded parallel beam by an expander optical system 2, reflected by a total reflection prism 3, and is made incident upon a first cylindrical lens 4. The first cylindrical lens 4 focuses the incident light beam only in a direction perpendicular to a first direction which is an extension direction of a later-described rectilinear scanning beam. The first cylindrical lens 4 images the incident laser beam onto a mirror surface of a micromirror device 5. Accordingly, a focused line-shaped laser beam strikes the mirror surface of the micromirror device 5. The first cylindrical lens 4 is not an essential component of the invention, but disposed when necessary.

As described above, the micromirror device 5 comprises a plurality of micromirrors arranged in a two-dimensional array. Each micromirror has, e.g., a rectangular reflection surface of 14 $\mu$m×10 $\mu$m and is vibrated at a high speed in accordance with an inputted driving signal. By this high-speed vibration, each micromirror is deformed or curved in one direction as a whole to function as a cylindrical mirror. Thus, the micromirror device 5 operates as an aggregate of cylindrical mirrors having micro reflective surface, and thus a rectilinear light beam having thin elongated cross section and diverging in one direction is produced. The light beam emitted from the micromirror device 5 diverges in the first direction and also slightly in the second direction. However, the divergence of the second direction is very small and weak compared with that of the first direction, and thus it gives no adverse influence on image quality. As a driving signal, a rectangular-wave driving pulse signal, a sine-wave driving signal or a sawtooth-wave driving signal can be used.

The diverging rectilinear light beam emitted from the micromirror device is converted into a beam parallel to the first direction by a focusing lens 6, reflected by a total reflection mirror 7, and strikes a second cylindrical lens 8.

The second cylindrical lens 8 has a lens ability for focusing only in the second direction perpendicular to the first direction. As described above, the light beam emitted from the micromirror device 5 may also have weak divergence in the second direction. Thus, the rectilinear beam emitted from the micromirror device is imaged in the second direction by using the second cylindrical lens 8. As a result, on an imaging point of the second cylindrical lens 8, a thin rectilinear illumination light beam parallel to the first direction and focused in the second direction.

According to the embodiment, a spatial filter 9 which has a slit extended in the first direction is arranged on the imaging point of the second cylindrical lens 8. This spatial filter 9 enhances confocal performance of the first direction, and it is arranged when necessary. That is, in the case of forming the rectilinear light beam focused in the second direction by using the second cylindrical lens 8, the spatial filter 9 is not always necessary. However, if the second cylindrical lens 8 is not used, a light beam which also diverges slightly in the second direction may be emitted from the micromirror device 5. In this case, by arranging the slit of the spatial filter 9, it is possible to produce the rectilinear beam and to achieve confocality in combination with a later-described linear image sensor.

The rectilinear light beam passed through the slit of the spatial filter 9 is reflected by a polarizing surface of a polarizing beam splitter 10 and strikes a vibration mirror 12 through a relay lens 11. This vibration mirror 12 deflects the rectilinear light beam in the second direction perpendicular to the extension direction of the rectilinear beam at for example a sub-scanning frequency of a television rate. The rectilinear light beam reflected by the vibration mirror 12 is made incident on an objective lens 15 through a relay lens 13 and a λ/4 plate 14. The objective lens 15 projects the incident rectilinear light beam onto a sample 17 mounted on an X-Y stage 16 as a thin rectilinear spot. Therefore, a thin rectilinear light spot which extends along a line corresponding to the first direction is formed on the sample 17 and the sample is one-dimensionally scanned by the rectilinear light spot.

The light beam reflected from the sample 17 is collected by the objective lens 15 and is made incident on the vibration mirror 12 through the λ/4 plate 14 and the relay lens 13. This reflected beam is descanned by the vibration mirror 12 and made incident on the polarizing beam splitter 10 through a relay lens 11. Since this incident beam is passed through the λ/4 plate 14 twice, its polarizing surface is rotated by 90°. Thus, the relevant beam is transmitted through the polarizing surface of the polarizing beam splitter 10 and separated from the scanning beam from the semiconductor laser. The reflected beam passed through the polarizing beam splitter 10 is reflected by a total reflection prism 18 and is made incident on a linear image sensor 19. The linear image sensor 19 comprises a plurality of light receiving elements arranged in a rectilinear manner along a direction corresponding to the first direction in which the rectilinear beam extends on the sample.

The reflected beam made incident on the linear image sensor 19 is maintained in a static state and is incident upon the array of the light receiving elements, because it has been descanned by the beam deflection device 12. Therefore, by sequentially reading out the charges stored in the respective light receiving elements of the linear image sensor 19 at a predetermined frequency such as a television rate, a video signal which contains two-dimensional luminance information of the sample 17 is outputted from the linear image sensor.

An output signal from the linear image sensor 19 is supplied to a signal processing circuit 21 through an amplifier 20 to produce a video signal.

Now, confocality of the optical system of the present invention will be described. Since a light incident surface of the respective light receiving element of the linear image sensor is defined by a frame, the linear image sensor 19 is recognized to be equivalent to a light sensor in which a special filter having a slit extended in the first direction is arranged on the front face thereof. Meanwhile, the second cylindrical lens 8 is arranged on the optical path of the illumination system and the thin rectilinear beam parallel to the first direction and focused in the second direction is formed in the imaging point of the second cylindrical lens 8. Thus, since the surface of the sample is scanned by the focused thin linear beam and the thin line-like slit is arranged at the imaging plane of the sample, high confocal performance is achieved with respect to the second direction. As a result, it is possible to pick up a high-resolution and clear sample image. In place of using the second cylindrical lens 8, a rectilinear light beam on the illumination system can be produced by combining the focusing lens 6 and the spatial filter 9.

Driving control of the laser microscope is carried out under the control of a controller 30. A driving signal generated from the controller 30 is supplied to a micromirror driving circuit 31, and a driving pulse generated by the micromirror driving circuit 31 is supplied to the micromirror device 5 to drive the micromirror device. A frequency of this driving pulse can be set higher than a reading frequency of the linear image sensor 19, e.g., 20 kHz or higher. Additionally, a clock signal generated from the controller 30 is supplied to a vibration mirror driving circuit 32 to produce and supply a driving signal of a sub-scanning frequency of, e.g., a television rate to the vibration mirror 12. Further, a driving pulse from the controller 30 is supplied to a linear image sensor driving circuit 33, and a driving signal is supplied from the linear image sensor driving circuit 33 to the linear image sensor 19 and the charges stored in the respective light receiving elements are read out at a predetermined reading frequency to produce the video signal of the sample.

The present invention is not limited to the embodiment, and various changes and modifications can be made. For example, in the above-described embodiments, the micromirror device in which the micromirrors are arranged in the two-dimensional array shape is used. However, it is possible to use a micromirror device in which a plurality of micromirrors are arranged in a form other than the two-dimensional array shape. For example, a micromirror device in which a plurality of micromirrors are arranged in one-dimensional manner is used, and a laser beam which is expanded along the align direction of the micromirrors is projected onto the micromirror device.

What is claimed is:

1. An optical device for producing an incoherent rectilinear light beam having a thin elongated cross section from a coherent laser beam comprising:

a laser light source for emitting a coherent laser beam with a substantially circular or elliptical cross section;

a micromirror device having a plurality of micromirrors that are arranged in a two-dimensional array and repetitively receive driving pulse signals to vibrate at high speed; and a micromirror driving circuit for uniformly and repetitively supplying the driving pulse signals with high frequency to substantially all the micromirrors of the micromirror device;

wherein said micromirror device receives the coherent laser beam emitted from the laser light source and produces the incoherent rectilinear light beam having substantially uniform luminescence and diverging in a first direction due to the high speed vibrations of the plurality of the micromirrors as a whole.

2. An optical device according to claim 1, wherein an expander optical system for converting the laser beam emitted from the laser source into an expanded parallel beam and a cylindrical lens for focusing the expanded laser beam emitted from the expander optical system in a second direction perpendicular to the first direction are arranged in the optical path between the laser source and the micromirror device so that the laser beam focused in the second direction is made incident on the micromirror device.

3. An optical device according to claim 1, wherein a focusing lens is arranged in the optical path of an emission side of the micromirror device to convert the diverging beam emitted from the micromirror device into a rectilinear light beam which extends substantially parallel to the first direction.

4. An optical device according to claim 1, wherein said micromirror device operates as a cylindrical mirror due to the high speed vibrations of the plurality of the micromirrors.

5. A laser microscope comprising:
  a laser light source for emitting a coherent laser beam with a substantially circular or elliptical cross section;
  a micromirror device having a plurality of micromirrors that are arranged in a two-dimensional array and repetitively receive driving pulse signals to vibrate at high speed, and receive the coherent laser beam to produce an incoherent rectilinear light beam having substantially uniform luminescence and diverging in a first direction due to the high speed vibrations of the plurality of the micromirrors as a whole;
  a micromirror driving circuit for uniformly and repetitively supplying the driving pulse signals with high frequency to substantially all the micromirrors of the micromirror device;
  a beam deflection device for deflecting the rectilinear light beam emitted from the micromirror device in a second direction perpendicular to the first direction;
  an objective lens for focusing the rectilinear light beam onto a sample to be observed;
  a linear image sensor having a plurality of light receiving elements arranged in a direction corresponding to the first direction, and receiving the reflected light from the sample; and
  a signal processing circuit which sequentially reads out charges stored in each of the light receiving elements of the linear image sensor at a predetermined reading frequency and outputs a video signal.

6. A laser microscope according to claim 5, wherein the reflected light from the sample is condensed by the objective lens and made incident on the image sensor through the beam deflecting device.

7. A laser microscope according to claim 6, wherein an expander optical system for converting the laser beam emitted from the laser source into an expanded parallel beam and a cylindrical lens for focusing the expanded laser beam emitted from the expander optical system only in the second direction are arranged in the optical path between the laser source and the micromirror device so that the laser beam focused in the second direction is made incident on the micromirror device.

8. A laser microscope according to claim 7, wherein a second cylindrical lens having a focusing ability only in the second direction is arranged on an optical path of an emission side of the micromirror device so that the incoherent rectilinear light beam focusing in the second direction is formed on an illumination path.

9. A laser microscope according to claim 7, wherein a focusing lens is arranged in the optical path between the micromirror device and the beam deflection device to convert the incoherent diverging beam emitted from the micromirror device into an incoherent rectilinear light beam which extends substantially parallel to the first direction.

10. A laser microscope according to claim 9, wherein a spatial filter having a slit extending in the first direction is arranged in the optical path between the focusing lens and the beam deflection device.

11. A laser microscope according to claim 5, wherein said micromirror device operates as a cylindrical mirror having a diverging ability in the first direction due to the vibrations of the plurality of micromirrors.

12. A laser microscope according to claim 5, wherein the frequency of the driving pulse signal for the micromirror device is set higher than the reading frequency of the linear image sensor.

* * * * *